United States Patent
Sato et al.

(10) Patent No.: US 8,395,712 B2
(45) Date of Patent: Mar. 12, 2013

(54) WIRELESS RECEIVING APPARATUS, WIRELESS COMMUNICATION SYSTEM, AND METHOD OF SUPPORTING ANTENNA INSTALLATION

(75) Inventors: Tetsuya Sato, Osaka (JP); Koichiro Tanaka, Hyogo (JP); Keiichiro Obayashi, Osaka (JP); Makoto Funabiki, Osaka (JP)

(73) Assignee: Panasonic Corporation, Osaka (JP)

( * ) Notice: Subject to any disclaimer, the term of this patent is extended or adjusted under 35 U.S.C. 154(b) by 84 days.

(21) Appl. No.: 13/147,620

(22) PCT Filed: Oct. 22, 2010

(86) PCT No.: PCT/JP2010/006253
§ 371 (c)(1),
(2), (4) Date: Aug. 3, 2011

(87) PCT Pub. No.: WO2011/052168
PCT Pub. Date: May 5, 2011

(65) Prior Publication Data
US 2011/0292301 A1 Dec. 1, 2011

(30) Foreign Application Priority Data
Oct. 28, 2009 (JP) .................................. 2009-248274

(51) Int. Cl.
*H04N 5/50* (2006.01)
(52) U.S. Cl. .................. 348/731; 348/570; 348/725
(58) Field of Classification Search .............. 348/731, 348/725–726, 570, 21, 552–555, 674, 678, 348/738, 727, 685; 342/359, 74–75, 423, 342/425, 426; 455/67.1, 67.2–67.7, 25, 226.1, 455/226.2, 277.1, 151.1, 562.1, 272, 130–135; 725/72; 375/232; *H04N 5/50, 5/44*
See application file for complete search history.

(56) References Cited

U.S. PATENT DOCUMENTS 6,509,934 B1 * 1/2003 Bao et al. ....................... 348/570
6,697,610 B1 * 2/2004 Tait ............................. 455/277.1
(Continued)

FOREIGN PATENT DOCUMENTS

JP 2004-180038 6/2004
JP 2005-286428 10/2005
(Continued)

OTHER PUBLICATIONS

International Search Report issued Nov. 22, 2010 in International (PCT) Application No. PCT/JP2010/006253.
(Continued)

*Primary Examiner* — Trang U Tran
(74) *Attorney, Agent, or Firm* — Wenderoth, Lind & Ponack, LLP.

(57) ABSTRACT

A television (10) includes: a WiHD-RX (11) which receives signals transmitted from a camcorder (20) and a BD system (30); an orientation detection unit (102) which detects information indicating a relative position between a WiHD-TX (21) and a WiHD-RXTX (31); a communication status obtainment unit (104*a*) which obtains communication status information indicating whether or not it is possible to transmit a video signal or an audio signal from one of the camcorder (20) and the BD system (30) to the other; and a change information generation unit (104*b*) which generates, based on a detection result of by the orientation detection unit (102), and outputs change information when the communication status information indicates that the transmission is not possible. The change information indicates a direction for moving a communication range of the video signal or the audio signal from the WiHD-TX (21) closer to the WiHD-RXTX (31).

10 Claims, 14 Drawing Sheets

U.S. PATENT DOCUMENTS

| | | | |
|---|---|---|---|
| 7,848,741 B2 * | 12/2010 | Kivekas et al. | 455/423 |
| 7,852,415 B2 * | 12/2010 | Lee | 348/725 |
| 7,904,117 B2 | 3/2011 | Doan et al. | |
| 8,139,158 B2 * | 3/2012 | Onomatsu | 348/731 |
| 2004/0106436 A1 | 6/2004 | Ochi et al. | |
| 2005/0289631 A1 * | 12/2005 | Shoemake | 725/118 |
| 2006/0079286 A1 | 4/2006 | Ochi et al. | |
| 2006/0079287 A1 | 4/2006 | Ochi et al. | |
| 2007/0037528 A1 | 2/2007 | Doan et al. | |
| 2007/0191068 A1 | 8/2007 | Ochi et al. | |

FOREIGN PATENT DOCUMENTS

| | | |
|---|---|---|
| JP | 2009-505507 | 2/2009 |
| WO | 2007/021891 | 2/2007 |

OTHER PUBLICATIONS

WirelessHD Specification Version 1.0 Overview, Oct. 9, 2007.

* cited by examiner

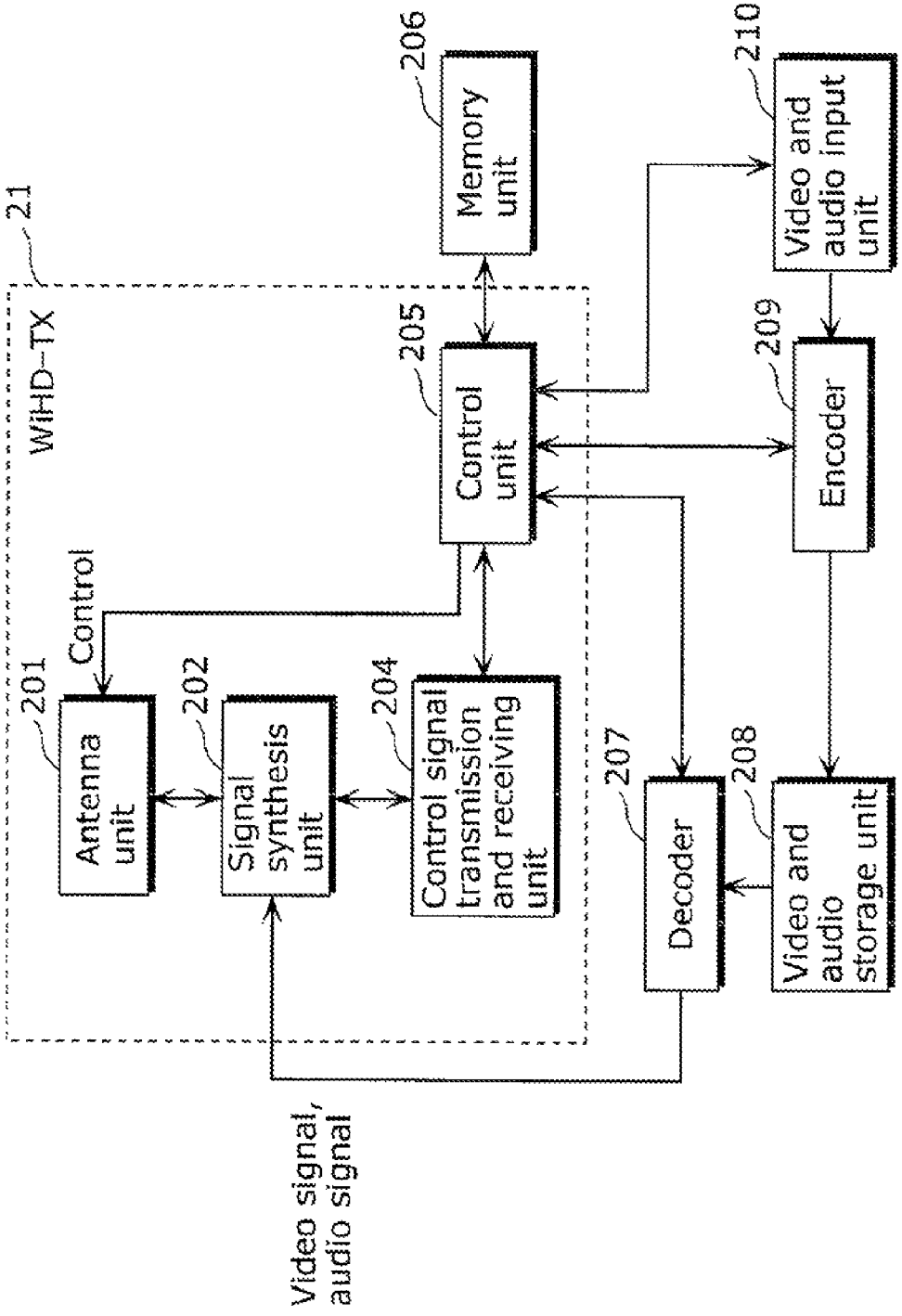

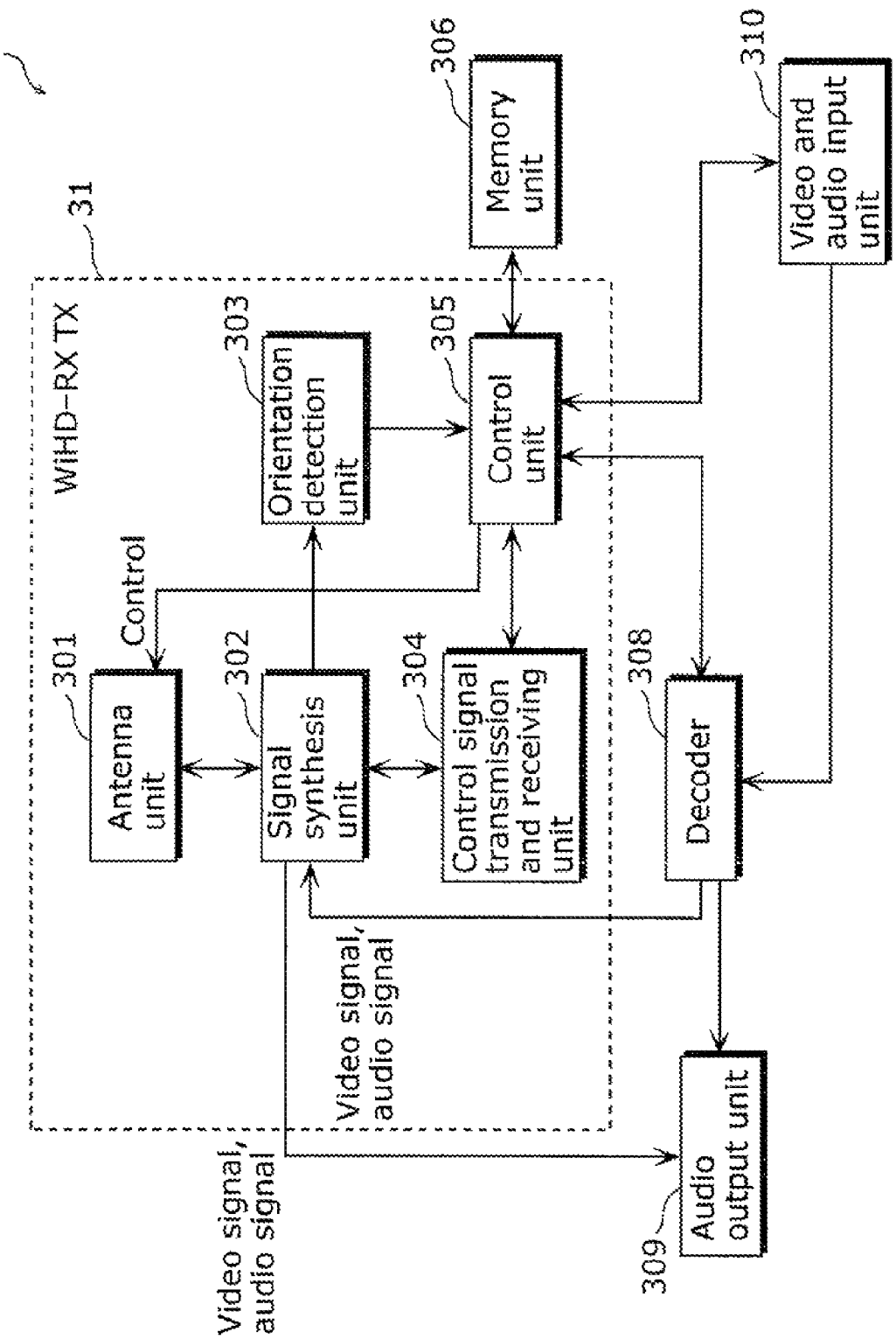

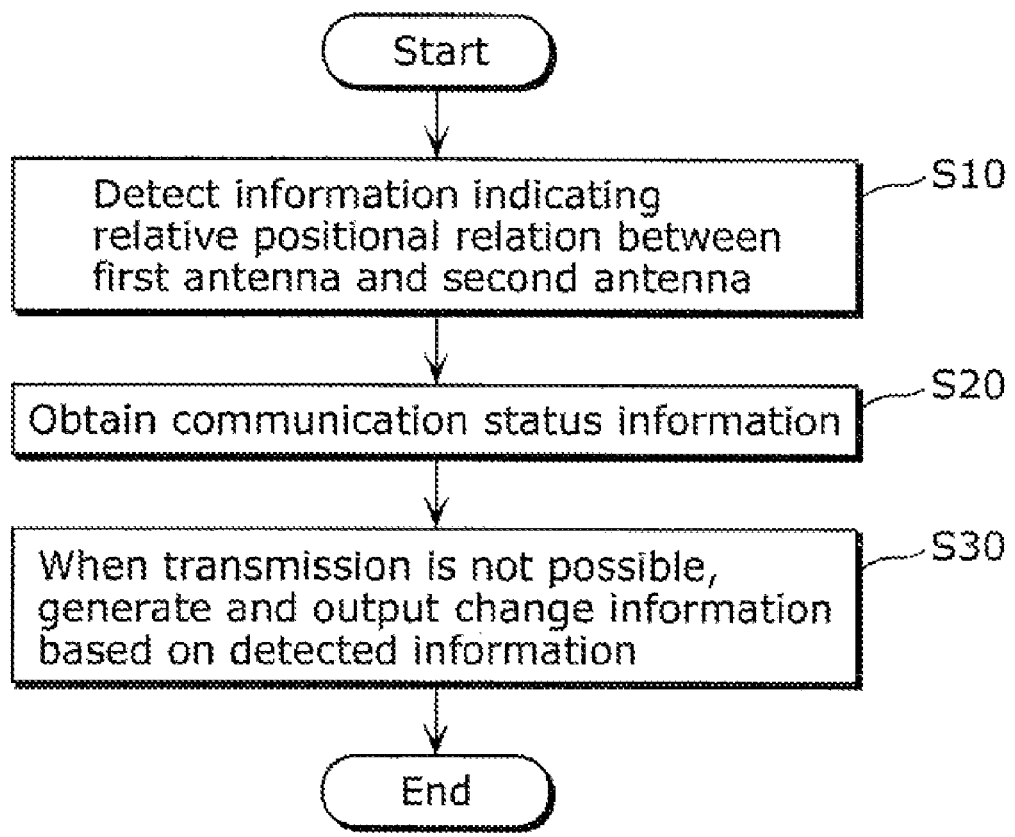

Fig. 8

| No. | Apparatus | Wireless communication |
|---|---|---|
| 1 | BD system | OK |
| 2 | Camcorder | Error |
| 3 | | |
| 4 | | |

Fig. 9

Camcorder communication status
  Camcorder to TV: OK
  Camcorder to BD system: Error

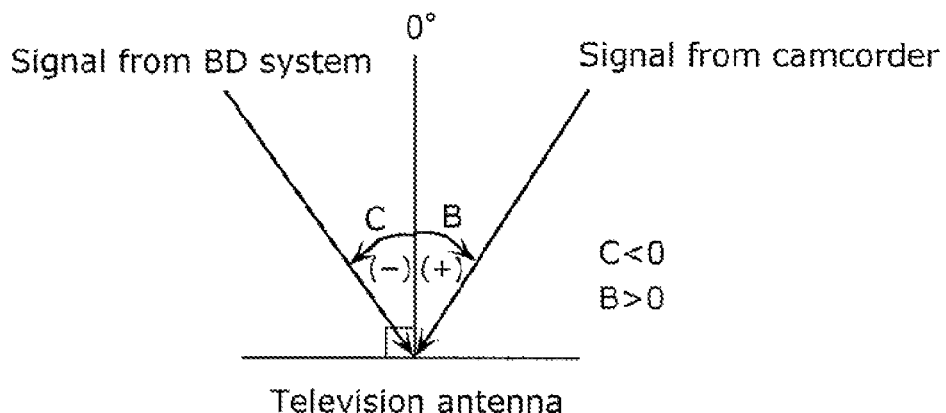

Fig. 13

WiHD antenna installation guidance

All the WiHD communications are now available.
Fix the antenna(s) at the current position(s).

Antenna installation guidance will now terminate.

ND METHOD OF SUPPORTING ANTENNA
WIRELESS RECEIVING APPARATUS, WIRELESS COMMUNICATION SYSTEM, AND METHOD OF SUPPORTING ANTENNA INSTALLATION

TECHNICAL FIELD

The present invention relates to a wireless receiving apparatus for supporting installation of an antenna for use in wireless transmission of an uncompressed video signal and the like between apparatuses.

BACKGROUND ART

WirelessHD (WiHD (high definition)) is a standard specified for wireless transmission of an uncompressed baseband video signal and an uncompressed digital audio signal between audio-visual apparatuses.

WiHD is a technical specification for allowing HD video data stored in digital video recorders such as a Blu-ray Disc (registered trademark, hereinafter referred to as BD) recorder, set-top boxes (STB), and personal computers to be displayed on HD televisions without wire connection.

Signals transmitted and received according to WiHD includes bidirectional control signals. A protocol is therefore specified for coordinated operation of a television and a digital video recorder and for central control of apparatuses constituting a home theater system.

In addition, Digital Transmission Content Protection (DTCP) is specified as a content protection method against fraudulent reproduction and illegal copy of content because WiHD allows transmission of high quality content.

The communication model of WiHD includes three functional divisions: the physical layer, the medium access control (MAC) sublayer, and the adaptation sublayer.

Among these divisions, the physical layer has two types of physical data transmission methods specified. Specifically, the two specified physical layers are the high rate physical layer (HRP) and the low rate physical layer (LRP).

The HRP is capable of high-speed transmission in excess of 3 Gbps and used mainly for transmission of uncompressed high quality content. The HRP is highly directional due to characteristics of the frequency band thereof. On the other hand, the LRP uses an omni-directional wave and is used mainly for transmission of control signals and wave path information between apparatuses.

Methods of wireless transmission according to WiHD having such characteristics are disclosed in literatures such as PTL 1 and NPL 1.

CITATION LIST

Patent Literature

[PTL 1] Japanese Unexamined Patent Application Publication No. 2009-505507

Non Patent Literature

[NPL 1] WirelessHD Specification Version 1.0 Overview, Oct. 9, 2007

SUMMARY OF INVENTION

Technical Problem

The HRP used in WiHD is so highly directional as mentioned above that an antenna of an audio and video transmitter (hereinafter briefly referred to as a transmitter) and an antenna of an audio and video receiver (hereinafter briefly referred to as a receiver) needs to be installed with consideration for the orientations of the antennas so that the antennas are within a certain range from each other.

In addition, in the case where a transmitter transmits a video signal to a television, which is one receiver, and an audio signal to an audio-visual (AV) amplifier, which is another receiver, so that the transmitter transmits an HRP signal to the receivers, that is, the television and the AV amplifier, each of the receivers needs to be installed within a communication range which is covered by transmission of the HRP signal from the transmitter.

However, installing antennas of the apparatuses in appropriate orientations is difficult because it is difficult for users to identify a traveling direction of a radio signal.

The present invention, conceived to address the problem with conventional techniques, has an object of providing a wireless receiving apparatus and a wireless communication system which support installation of antennas for use in signal transmission between the wireless receiving apparatus and two apparatuses, which communicate with the wireless receiving apparatus, so as to allow the transmission, and a method of supporting installation of antennas for use in the transmission.

Solution to Problem

In order to achieve the object, a wireless receiving apparatus according to an aspect of the present invention includes: a receiving-apparatus antenna for receiving signals transmitted from a first apparatus and a second apparatus via an antenna of each of the first apparatus and the second apparatus; a detection unit configured to detect information indicating a relative position between a first antenna of the first apparatus and a second antenna of the second apparatus with respect to a position of the receiving-apparatus antenna; a communication status obtainment unit configured to obtain, from the first apparatus or the second apparatus, communication status information indicating whether or not it is possible to transmit a video signal or an audio signal from one of the first apparatus and the second apparatus to the other; and a change information generation unit configured to generate, when the communication status information obtained by the communication status obtainment unit indicates that the transmission is not possible, change information based on the information detected by the detection unit and output the change information, the change information indicating a change direction for an orientation of the first antenna such that a communication range is closer to the second antenna, and the communication range being a range covered by the transmission of the video signal or the audio signal from the first antenna.

In this configuration, for example, when a television, which is the wireless receiving apparatus, and two AV apparatuses, which are the first apparatus and the second apparatus, are installed, the wireless receiving apparatus outputs change information for transmitting a video signal or an audio signal between the two AV apparatuses and for changing an orientation of the antenna of at least one of the AV apparatuses. That is, information to support installation of antennas for use in the transmission is provided by the wireless receiving apparatus.

The wireless receiving apparatus according to an aspect of the present invention thus supports installation of antennas for use in transmission of a video signal or an audio signal between two apparatuses.

Furthermore, a wireless receiving apparatus according to an aspect of the present invention may further include an image display unit configured to display an image showing the change direction indicated in the change information output from the change information generation unit.

In this configuration, the image showing the change direction on the image display unit allows the user to easily learn the change direction. The user thereby adjusts the orientation of the first antenna with ease.

Furthermore, in the wireless receiving apparatus according to an aspect of the present invention, the image display unit may be configured to display, in addition to the image showing the change direction, a video represented by the video signal transmitted from the first apparatus or the second apparatus and received via the receiving-apparatus antenna.

In this configuration, a wireless receiving apparatus according to the aspect may be implemented as, for example, a television which displays an image received from the first apparatus and the change information as an on-screen display.

Furthermore, in a wireless receiving apparatus according to an aspect of the present invention, the first antenna may be rotatably supported by a rotation drive unit configured to operate according to the change information, and the change information generation unit may be configured to generate the change information indicating a change direction for the orientation of the first antenna and output the generated change information to the rotation drive unit to rotate the first antenna in the change direction.

In this configuration, the first antenna automatically changes its orientation so that the first apparatus and the second apparatus can transmit a video signal or an audio signal from one to the other. In other words, the antenna orientation is automatically adjusted.

Furthermore, in a wireless receiving apparatus according to an aspect of the present invention, the detection unit may be configured to detect, as information indicating the relative position, (i) a first incident angle of a signal transmitted from the first apparatus with respect to the receiving-apparatus antenna and (ii) a second incident angle of a signal transmitted from the second apparatus with respect to the receiving-apparatus antenna, and the change information generation unit may be configured to determine a relative position between the first antenna and the second antenna from a magnitude relation between the first incident angle and the second incident angle, and generate the change information indicating the change direction for the orientation of the first antenna according to the relative position.

In this configuration, for example, a relative position between the first antenna and the second antenna is accurately determined.

Furthermore, in a wireless receiving apparatus according to an aspect of the present invention, the detection unit may be configured to detect, as information indicating the relative position, (i) a first incident angle of a signal transmitted from the first apparatus with respect to the receiving-apparatus antenna and (ii) a second incident angle of a signal transmitted from the second apparatus with respect to the receiving-apparatus antenna, the receiving-apparatus antenna may transmit, to the first apparatus or the second apparatus, information indicating the first incident angle and the second incident angle, and the change information generation unit may be configured to generate the change information indicating a change direction for the orientation of the first antenna according to a relative position between the first antenna and the second antenna, the relative position being determined, from a magnitude relation between the first incident angle and the second incident angle, by one of the first apparatus and the second apparatus which has received the information.

In this configuration, for example, processing load of the wireless receiving apparatus may be transferred to another apparatus.

Furthermore, in a wireless receiving apparatus according to an aspect of the present invention, the communication status obtainment unit may be configured to obtain communication status information indicating whether or not it is possible to transmit a video signal or an audio signal from one of the first apparatus and the second apparatus to the other using a high rate physical layer (HRP) specified by a WirelessHD standard.

In this configuration, an antenna for transmission of high-quality content between the first apparatus and the second apparatus according to WirelessHD is easily installed.

Furthermore, in a wireless receiving apparatus according to an aspect of the present invention, the communication status obtainment unit may be further configured to repeatedly obtain communication status information indicating whether or not the transmission is possible, until the communication status obtainment unit obtains communication status information indicating that the transmission is possible, and the change information generation unit may be further configured to repeatedly output change information indicating a direction for moving the communication range of the first antenna closer to the second antenna, until the communication status obtainment unit obtains the communication status information indicating that the transmission is possible.

In this configuration, for example, the support for antenna installation may be continued until transmission of a video signal or an audio signal from one of the first antenna and the second antenna to the other becomes possible.

Furthermore, a wireless communication system according to an aspect of the present invention includes a first apparatus, a second apparatus, and a wireless receiving apparatus, wherein the first apparatus includes a first antenna for transmission of a signal between the first apparatus and the second apparatus and between the first apparatus and the wireless receiving apparatus, the second apparatus includes a second antenna for transmission of a signal between the second apparatus and the first apparatus and between the second apparatus and the wireless receiving apparatus, a receiving-apparatus antenna for receiving signals transmitted from the first apparatus and the second apparatus via the first antenna and the second antenna respectively included in the first apparatus and the second apparatus; a detection unit configured to detect information indicating a relative position between the first antenna and the second antenna with respect to a position of the receiving-apparatus antenna; a communication status obtainment unit configured to obtain, from the first apparatus or the second apparatus, communication status information indicating whether or not it is possible to transmit a video signal or an audio signal from one of the first apparatus and the second apparatus to the other; and a change information generation unit configured to generate, when the communication status information obtained by the communication status obtainment unit indicates that the transmission is not possible, change information based on the information detected by the detection unit and output the change information, the change information indicating a change direction for an orientation of the first antenna such that a communication range is closer to the second antenna, and the communication range being a range covered by the transmission of the video signal or the audio signal from the first antenna.

Furthermore, the present invention may be implemented as a method of supporting antenna installation including processes to be performed by the components included in the wireless receiving apparatus according to any one of the above aspects.

Furthermore, the present invention may be implemented as a program which causes a computer to execute the processes included in the method of supporting antenna installation according to the present invention.

Furthermore, the program may be widely distributed by media such as recording media typified by a digital versatile disc (DVD) or transmission media typified by the Internet.

Furthermore, all or part of the components included in the wireless receiving apparatus according to any one of the above aspects of the present invention may be implemented as a system large-scale integration (LSI). The system LSI is a super-multifunctional LSI manufactured by integrating constituent units on one chip, and is specifically a computer system including a microprocessor, a read-only memory (ROM), and a random access memory (RAM).

Advantageous Effects of Invention

The present invention provides a wireless receiving apparatus and a wireless communication system which support installation of antennas for use in signal transmission between the wireless receiving apparatus and two apparatuses, which communicate with the wireless receiving apparatus, so as to allow the transmission, and a method of supporting installation of antennas for use in the transmission.

According to the present invention, for example, when a television, which is the wireless receiving apparatus, and two AV apparatuses, which communicate with the television, are installed, change information is output which indicates a change direction for an orientation of at least one of the antennas of the two AV apparatuses so that a video signal or an audio signal may be transmitted between the two AV apparatus.

This allows a user to clearly learn the change direction for the orientation of the antenna and to appropriately orient the antenna with ease. Furthermore, for example, providing the change information to a device which rotates the antenna allows automatic adjustment of the orientation of the antenna.

Furthermore, according to the present invention, antenna installation is supported even when four or more apparatuses including the three apparatuses of the wireless receiving apparatus and the two other apparatuses, so that each of the apparatuses may properly transmit and receive a video signal and an audio signal.

BRIEF DESCRIPTION OF DRAWINGS

FIG. 3 is a block diagram showing a configuration of main functions of a camcorder according to the embodiment of the present invention.

FIG. 4 is a block diagram showing a configuration of main functions of a BD system according to the embodiment of the present invention.

FIG. 5A is a flowchart showing a basic process flow of supporting installation of antennas according to the embodiment.

FIG. 8 shows an example of information indicating whether or not WiHD communications are possible according to the embodiment.

FIG. 9 shows an example of information indicating details of a problem in WiHD communications according to the embodiment.

FIG. 10 is a drawing illustrating a relation between incident angles of two signals and a change direction for the antenna according to the embodiment.

FIG. 11 shows an exemplary display of information to show a user a change direction for an orientation of the antenna according to the embodiment.

FIG. 13 shows an exemplary display of information to notify the user that WiHD communications are now possible between all of the apparatuses according to the embodiment.

DESCRIPTION OF EMBODIMENT

The following describes an embodiment of a video processing apparatus according to the present invention with reference to the drawings.

Figure 1:
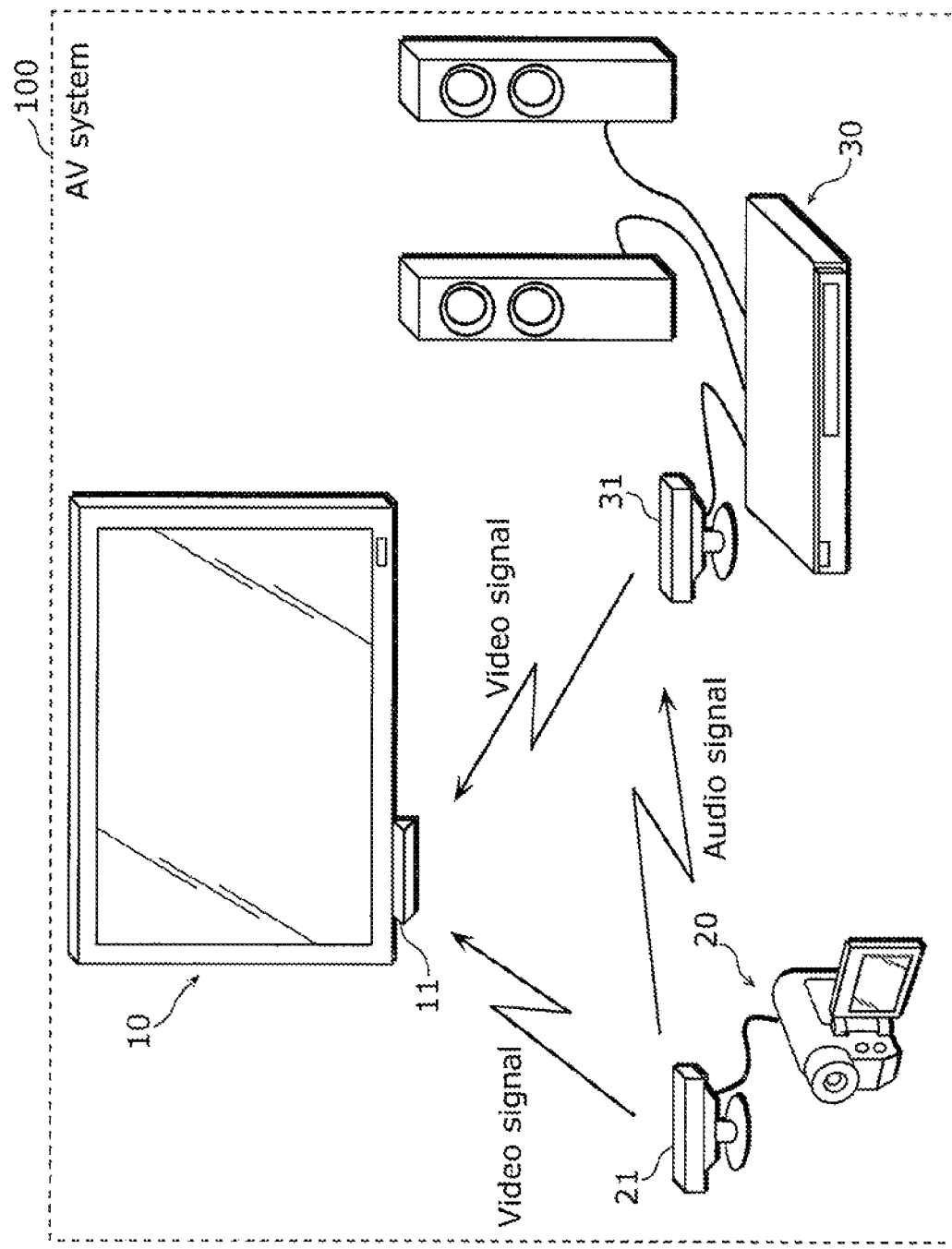
FIG. 1 shows a configuration of an AV system according to an embodiment of the present invention.

FIG. 1 shows a configuration of an AV system 100 according to the embodiment of the present invention.

The AV system 100 is an example of a wireless communication system according to the present invention, and includes a television 10, a camcorder 20, and a BD system 30 as shown in FIG. 1.

The television 10 includes a WiHD-RX 11, which is a WiHD video and audio receiving antenna. The camcorder 20 includes a WiHD-TX 21, which is a WiHD video and audio transmission antenna. The BD system 30 includes a WiHD-RXTX 31, which is a WiHD video and audio transmission and receiving antenna.

Each of the television 10, the camcorder 20, and the BD system 30 is an example of an apparatus which functions as either a wireless receiving apparatus or one of a first apparatus and a second apparatus which are communication partners of the wireless receiving apparatus according to the present invention.

In the embodiment, the following describes the television 10 functioning as the wireless receiving apparatus and one of the camcorder 20 and the BD system 30 as the first apparatus, and the other as the second apparatus.

The WiHD-RX 11 is an example of a receiving antenna of the wireless receiving apparatus according to the present invention. The WiHD-TX 21 is an example of one of a first antenna of the first apparatus, which is one of the communication partners of the wireless receiving apparatus according to the present invention, and a second antenna of the second apparatus, which is the other one of the communication partners of the wireless receiving apparatus according to the present invention. The WiHD-RXTX 31 is an example of the other one of the first antenna and the second antenna.

Although the antennas shown in FIG. 1 are externally connected to the apparatuses, the antennas may be incorporated into the respective apparatuses.

In the embodiment, the camcorder 20 transmits a video signal to the television 10 and an audio signal corresponding to the video signal to the BD system 30 via the WiHD-TX 21.

The television 10 reproduces a video from the video signal received from the camcorder 20 and displays the video. The BD system 30 reproduces a sound from the audio signal received from the camcorder 20 and outputs the sound through an amplifier and speakers of the BD system 30.

When the BD system 30 reproduces AV content recorded on a BD, the BD system 30 transmits a video signal of the AV content to the television 10 via the WiHD-RXTX 31 and outputs a sound of the AV content from the speakers of the BD system 30.

In this case, the television 10 reproduces a video from the video signal received from the BD system 30 and displays the video.

Figure 2:
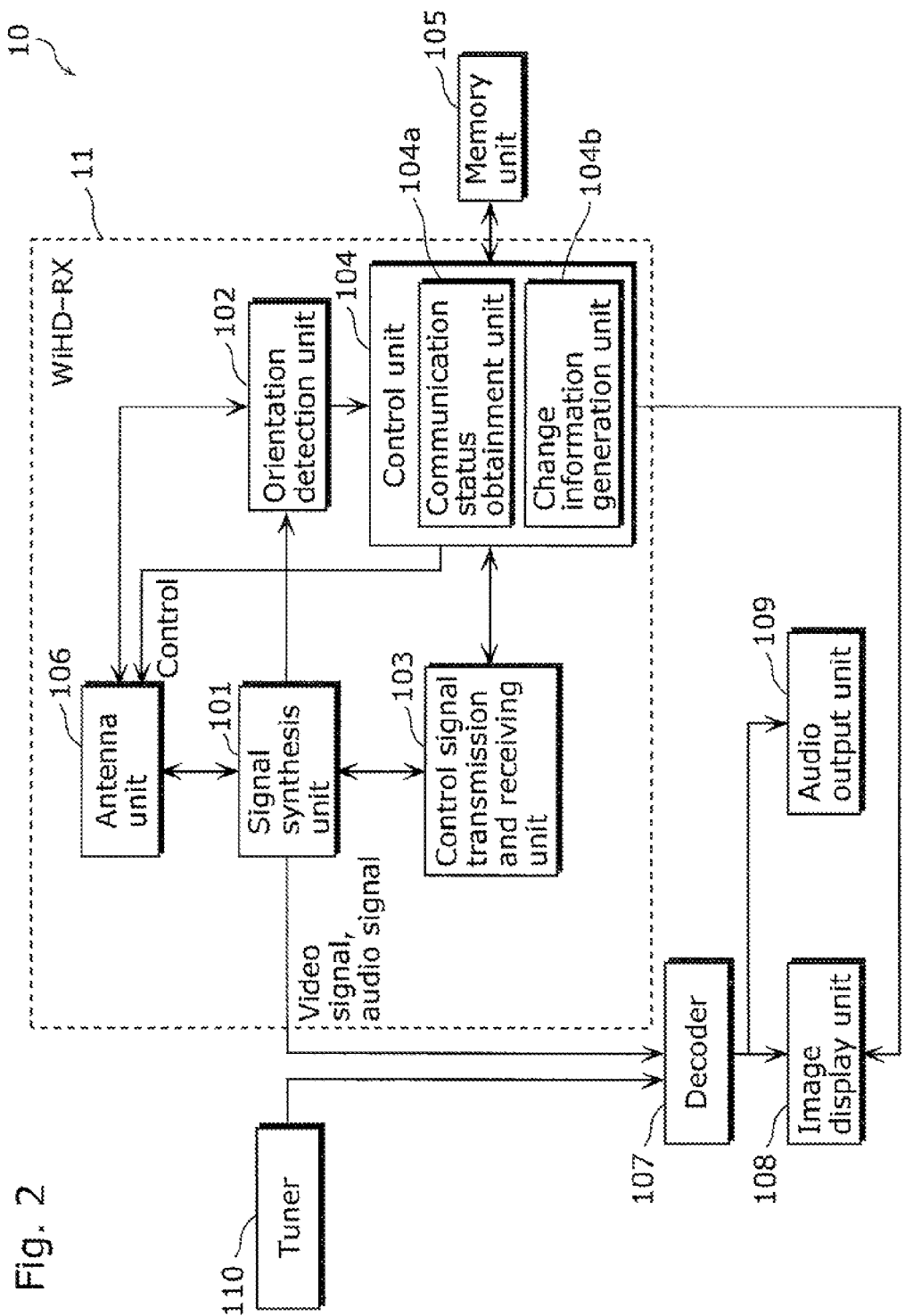
FIG. 2 is a block diagram showing a configuration of main functions of a television according to the embodiment of the present invention.

FIG. 2 is a block diagram showing a configuration of main functions of the television 10 according to the embodiment of the present invention.

The television 10 decodes WiHD signals received via an antenna unit 106 of the WiHD-RX 11 or a broadcast signal received via a broadcast antenna (not shown), and reproduces and outputs a video and a sound.

The television 10 includes the WiHD-RX 11, a memory unit 105, a decoder 107, an image display unit 108, an audio output unit 109, and a tuner 110.

The WiHD-RX 11 includes the antenna unit 106, a signal synthesis unit 101, an orientation detection unit 102, a control signal transmission and receiving unit 103, and the control unit 104.

The antenna unit 106 includes a plurality of antenna elements, receives an HRP signal, and transmits and receives an LRP signal. Each of the video signals and the audio signals transmitted is an HRP signal, and a control signal transmitted and received is an LRP signal.

The expression "a signal is transmitted" herein means that a signal is delivered from at least one of two apparatuses to the other one.

The signal synthesis unit 101 transfers a video signal and an audio signal included in the WiHD signals received by the antenna unit 106 to the decoder 107, and a control signal included in the WiHD signal to the control signal transmission and receiving unit 103.

The signal synthesis unit 101 converts a control signal received from the control signal transmission and receiving unit 103 into a WiHD signal and transmits the WiHD signal via the antenna unit 106.

In the present Description, the term "WiHD signal" is a generic term for signals transmitted and received as an HRP signal or an LRP signal according to the WiHD specification.

The orientation detection unit 102 is a processing unit which detects information indicating a relative position between the WiHD-TX 21 of the camcorder 20 and the WiHD-RXTX 31 of the BD system 30 with respect to the WiHD-RX 11.

Specifically, in the embodiment, the orientation detection unit 102 detects incident angles of received signals with respect to the WiHD-RX 11 from a reception status of the signals in each of the antenna elements (for example, phase difference of received signals between the antenna elements) of the antenna unit 106. In other words, the orientation detection unit 102 detects incident angles of the signals transmitted from the WiHD-TX 21 and the WiHD-RXTX 31 as information indicating the relative position. Then, the orientation detection unit 102 informs the control unit 104 of the detected information.

The control signal transmission and receiving unit 103 provides the control signal according to WiHD received via the signal synthesis unit 101 to the control unit 104, and converts a control command received from the control unit 104 into a control signal and provides the control signal to the signal synthesis unit 101.

The control unit 104 includes a communication status obtainment unit 104a and a change information generation unit 104b.

The control unit 104 is a processing unit which controls the components including the antenna unit 106, the control signal transmission and receiving unit 103, the memory unit 105, and the image display unit 108, and provides support for antenna installation to a user on the basis of the information provided from the orientation detection unit 102.

Specifically, the communication status obtainment unit 104a and the change information generation unit 104b included in the control unit 104 perform the following processes.

The communication status obtainment unit 104a obtains communication status information from the camcorder 20 or the BD system 30. The communication status information indicates whether or not it is possible to transmit a video signal or an audio signal from one of the camcorder 20 and the BD system 30 to the other.

In the embodiment, the communication status obtainment unit 104a obtains, from the camcorder 20 or the BD system 30, the communication status information indicating whether or not it is possible to transmit an audio signal from the camcorder 20 to the BD system 30. The communication status information is transmitted from the camcorder 20 as an LRP signal and the communication status obtainment unit 104a receives the communication status information via the antenna unit 106.

When the communication status information received by the communication status obtainment unit 104a indicates that the transmission of an audio signal is not possible, the change information generation unit 104b generates change information based on the information detected by the orientation detection unit 102.

The change information indicates a change direction for the orientation of an antenna to be oriented (the WiHD-TX 21 or the WiHD-RXTX 31). More specifically, the change information indicates a direction for moving a communication range closer to the WiHD-RX 11. Here, the communication range is a range covered by transmission of a video signal or an audio signal from the antenna.

In other words, the change information generation unit 104b generates and outputs change information for orientation of the WiHD-TX 21 or the WiHD-RXTX 31 in order to allow the transmission.

The processes in the control unit 104 are performed by, for example, a central processing unit (CPU) executing a certain program. Processes in control units (205 and 305) of the other apparatuses described below are also performed by, for example, a CPU executing a certain program.

The memory unit 105 receives, via the control unit 104, information on the apparatuses which have WiHD communications with the television 10, and stores the information.

The decoder 107 receives a video signal and an audio signal from the signal synthesis unit 101 or the tuner 110, and decodes the video signal and the audio signal such that the image display unit 108 and the audio output unit 109 may reproduce a video and a sound. A video signal resulting from the decoding is transmitted to the image display unit 108 and an audio signal resulting from the decoding is transmitted to the audio output unit 109.

The image display unit 108 is an apparatus which has a display panel and displays a video provided from the decoder 107. The image display unit 108 is also capable of displaying information indicated by the control unit 104 using an on-screen display (OSD).

The audio output unit 109 is an apparatus which has the amplifier and the speakers (not shown) and outputs a sound provided from the decoder 107.

The tuner 110 is an apparatus which receives a broadcast signal via an broadcast antenna (not shown) and transmits video data and audio data to the decoder 107.

The television 10 further includes not only the control unit 104 but also components such as a CPU for controlling the processing units including the decoder 107, but illustration and description of such components are omitted for clarity of the feature of the present invention.

FIG. 3 is a block diagram showing a configuration of main functions of the camcorder 20 according to the embodiment of the present invention.

The camcorder 20 is an apparatus which records a video signal and an audio signal input via a video and audio input unit 210, decodes the recorded video signal and audio signal, and transmits the decoded video signal and audio signal as WiHD signals via an antenna unit 201 included in the WiHD-TX 21.

The camcorder 20 includes the WiHD-TX 21, a memory unit 206, a decoder 207, a video and audio storage unit 208, an encoder 209, and the video and audio input unit 210.

The WiHD-TX 21 includes the antenna unit 201, a signal synthesis unit 202, a control signal transmission and receiving unit 204, and the control unit 205.

The antenna unit 201 receives an LRP signal according to WiHD and provides the received signal to the signal synthesis unit 202. The antenna unit 201 transmits, as an HRP signal or an LRP signal, a signal received from the signal synthesis unit 202.

Specifically, each of the video signal and the audio signal transmitted is a HRP signal, and a control signal transmitted and received is an LRP signal.

The signal synthesis unit 202 transfers a control signal included in the WiHD signal received by the antenna unit 201 to the control signal transmission and receiving unit 204. The signal synthesis unit 202 also converts a video signal and an audio signal received from the decoder 207 and a control signal received from the control signal transmission and receiving unit 204 into WiHD signals and transmits the WiHD signals via the antenna unit 201.

As described above, the video signal is transmitted to the television 10 and the audio signal corresponding to the video signal is transmitted to the BD system 30.

The control signal transmission and receiving unit 204 provides the control signal according to WiHD received from the signal synthesis unit 202 to the control unit 205. The control signal transmission and receiving unit 204 also converts a control command received from the control unit 205 into a control signal according to WiHD and provides the control signal to the signal synthesis unit 202.

The control unit 205 is a processing unit which performs controls by executing a certain program.

The memory unit 206 receives, via the control unit 205, information on the apparatuses which have WiHD communications with the camcorder 20, and stores the information.

The decoder 207 receives a video signal and an audio signal from the video and audio storage unit 208, decodes the video signal and the audio signal, and transmits the signal resulting from the decoding the signal synthesis unit 202.

The video and audio storage unit 208 stores data compressed by the encoder 209 when recording a video or a sound, and transmits the data to the decoder 207 when reproducing the video or the sound. The video and audio storage unit 208 may include a hard disk or a flash memory.

The encoder 209 converts a video signal and an audio signal received from the video and audio input unit 210 into compressed data in a format such as MPEG-4 such that the video signal and audio signal may be stored in the video and audio storage unit 208.

The video and audio input unit 210 sends a video signal and an audio signal input from a camera and a microphone (not shown) to the encoder 209.

The camcorder 20 further includes not only control unit 205 but also components such as a CPU for controlling the processing units including the decoder 207, but illustration and description of such components are omitted for clarity of the feature of the present invention.

FIG. 4 is a block diagram showing a configuration of main functions of the BD system 30 according to the embodiment of the present invention.

The BD system 30 is an apparatus which reproduces a sound from an audio signal included in WiHD signals received via an antenna unit 301 of the WiHD-RXTX 31 and outputs the sound. The BD system 30 further decodes video data and sound data input via a video and audio input unit 310 and transmits the decoded video data and sound data as WiHD signals via the antenna unit 301.

The BD system 30 includes the WiHD-RXTX 31, a memory unit 306, a decoder 308, a video and audio storage unit 309, and the video and audio input unit 310.

The WiHD-RXTX 31 includes the antenna unit 301, a signal synthesis unit 302, an orientation detection unit 303, a control signal transmission and receiving unit 304, and the control unit 305.

The antenna unit 301 includes a plurality of antenna elements, receives an HRP signal and an LRP signal according to WiHD, and transmits the received signals to the signal synthesis unit 302. The antenna unit 301 transmits, as an HRP signal or an LRP signal, a signal received from the signal synthesis unit 302.

The signal synthesis unit 302 transfers an audio signal included in the WiHD signals received by the antenna unit 301 to the audio output unit 309, and a control signal included in the WiHD signals to the control signal transmission and receiving unit 304.

The signal synthesis unit 302 also converts a video signal received from the decoder 308 and a control signal from the control signal transmission and receiving unit 304 into WiHD signals and transmits the WiHD signals via the antenna unit 301.

The orientation detection unit 303 detects incident angles of received signals with respect to the WiHD-RXTX 31 from a reception status of the signals in each of the antenna elements of the antenna unit 301, and notifies the control unit 305 of the detected incident angles.

The control signal transmission and receiving unit 304 provides the control signal according to WiHD received via the signal synthesis unit 302 to the control unit 305, and converts a control command received from the control unit 305 into a control signal according to WiHD and provides the control signal to the signal synthesis unit 302.

The control unit 305 is a processing unit which performs controls by executing a certain program.

The memory unit 306 receives, via the control unit 305, information on the apparatuses which have WiHD communications with the BD system 30, and stores the information.

The decoder 308 receives an audio signal from the video and audio input unit 310 and decodes the audio signal such that the audio output unit 309 may reproduce a sound. The audio signal resulting from the decoding is transmitted to the audio output unit 309.

The decoder 308 receives a video signal from the video and audio input unit 310 and decodes the video signal so that the television 10 may reproduce a video. The video signal resulting from the decoding is provided to the signal synthesis unit 302 and transmitted as an HRP signal to the television 10 via the antenna unit 301.

The audio output unit 309 is an apparatus which outputs a sound provided from the decoder 308 and the signal synthesis unit 302 and has an amplifier (not shown) and the speakers (see FIG. 1).

The video and audio input unit 310 includes a hard disk and a digital versatile disc (DVD)/BD drive (not shown), and obtains a video signal and an audio signal from a recording medium such as a BD, and transmits the signals to the decoder 308.

The BD system 30 further includes not only the control unit 305 but also components such as a CPU for controlling the processing units including the decoder 308, but illustration and description of such components are omitted for clarity of the feature of the present invention.

The following describes operation of the apparatuses including the television 10 when the television 10 supports installation of antennas in the AV system 100 configured in the manner as described above.

First described is a basic process flow of support to be provided by the television 10 for installation of antennas with reference to FIG. 5A.

FIG. 5A is a flowchart showing a basic process flow of supporting installation of antennas according to the embodiment.

The orientation detection unit 102 included in the television 10 detects information indicating relative position between the first antenna and the second antenna with respect to the WiHD-RX 11 (S10).

In the embodiment, one of the first antenna and the second antenna is the WiHD-TX 21 and the other is the WiHD-RXTX 31.

Next, the communication status obtainment unit 104a included in the television 10 obtains, from the first apparatus or the second apparatus, communication status information indicating whether or not it is possible to transmit a video signal or an audio signal from one of the first apparatus and the second apparatus to the other (S20).

Specifically, the communication status obtainment unit 104a obtains communication status information indicating whether or not it is possible to transmit an HRP signal from one of the camcorder 20 and the BD system 30 to the other.

Next, when the communication status information indicates that transmission is not possible, the change information generation unit 104b included in the television 10 generates, based on the detected information, change information indicating a change direction for the orientation of the first antenna and outputs the change information (S30).

For example, when transmission of an HRP signal from the camcorder 20 to the BD system 30 is not possible, the change information generation unit 104b generates change information indicating a direction for moving the communication range of the HRP signal from the WiHD-TX 21 closer to the WiHD-RXTX 31.

Figure 5B:
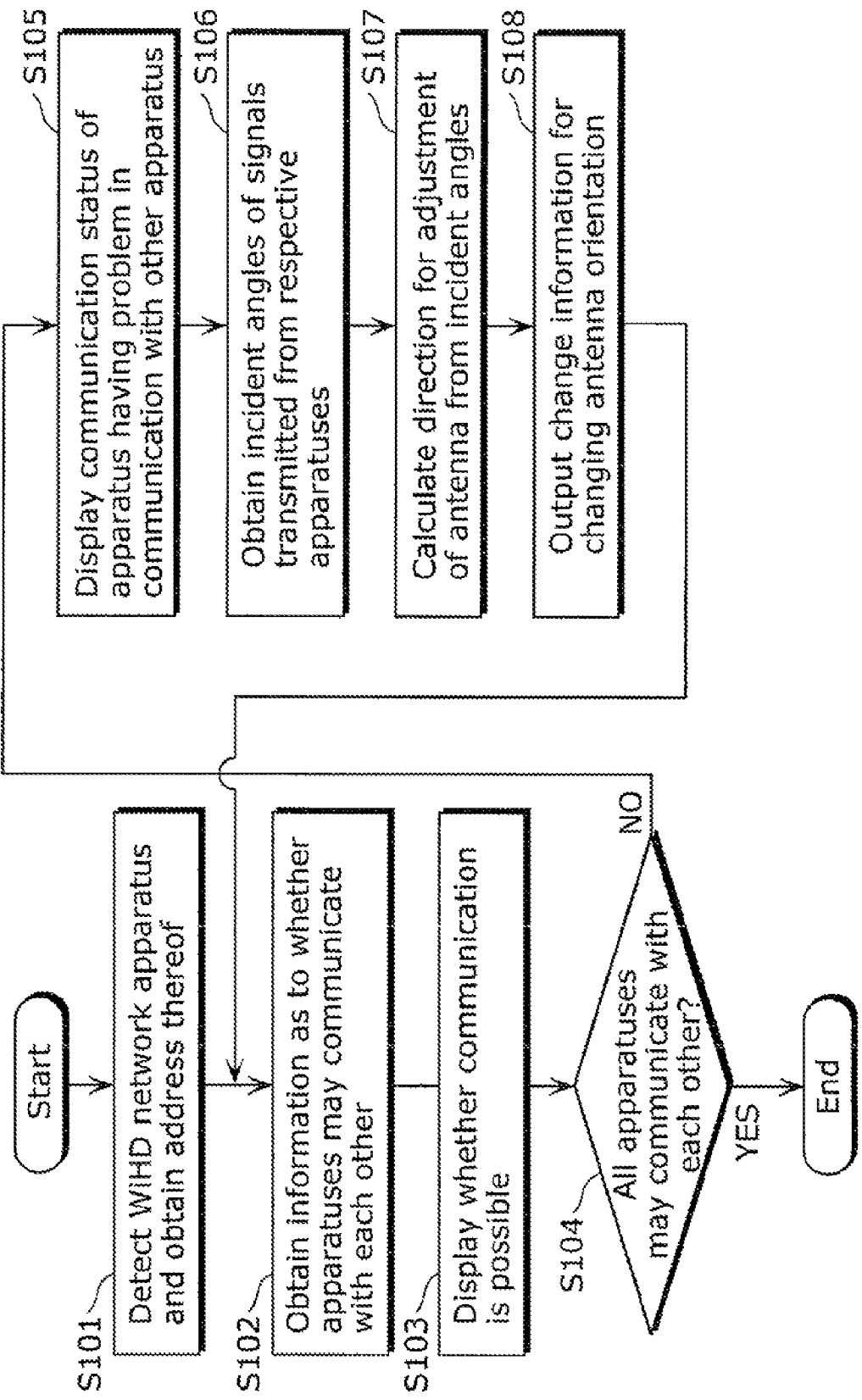
FIG. 5B is a flowchart showing an example of a process flow of supporting by the television for installation of antennas according to the embodiment.

Secondly described is a specific process flow of support for installation of antennas according to the embodiment with reference to FIG. 5B.

FIG. 5B is a flowchart showing an example of a process flow of supporting by the television 10 for installation of antennas according to the embodiment.

Figure 6:
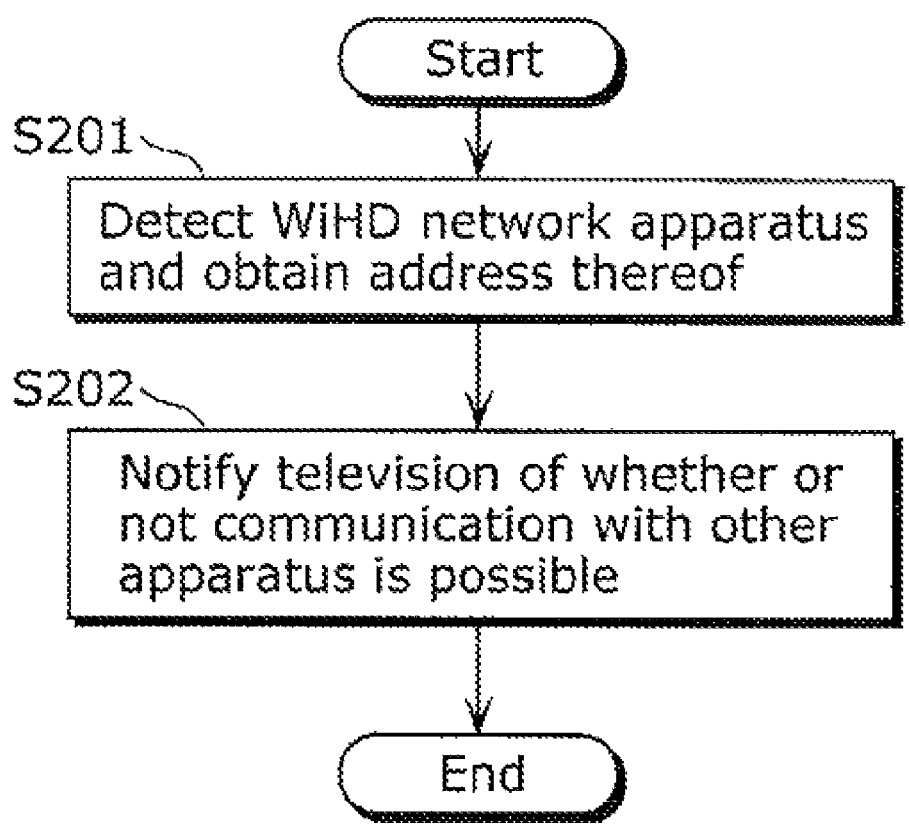
FIG. 6 is a flowchart showing an example of a process flow of supporting by the camcorder and the BD system for installation of antennas according to the embodiment.

FIG. 6 is a flowchart showing an example of a process flow of supporting by the camcorder 20 and the BD system 30 for installation of antennas according to the embodiment.

The following describes processes performed by the television 10, the camcorder 20, and the BD system 30 with reference to FIG. 7 to FIG. 13, which are described later, in addition to FIG. 5B and FIG. 6.

When turned on and WiHD functions are enabled, the television 10, the camcorder 20, and the BD system 30 each check for apparatuses with which communication using WiHD is possible ("WiHD network apparatus" in FIG. 5B and FIG. 6). When detecting another apparatus with which communication using WiHD is possible within its communication range, the apparatus transmits and receives control signals via its own control signal transmission and receiving unit (103, 204, 304) to obtain an address of the other apparatus in order to transmit a control signal to the other apparatus (S101 in FIG. 5B and S201 in FIG. 6).

Next, the television 10, the camcorder 20, and the BD system 30 notifies each other using WiHD whether or not functions of each own includes an HRP transmission function (TX function) and a receiving function (RX function) of video and sound.

In the embodiment, the television 10 has the RX function, the camcorder 20 has the TX function, and the BD system 30 has both of the TX function and the RX function. The control signals according to WiHD are exchanged as an LRP signal via the antenna units (106, 201, and 301) of the respective apparatuses.

The camcorder 20 and the BD system 30 confirm, with each of the apparatuses having the RX function detected using the control signals according to WiHD, whether or not it is possible to transmit data using an HRP signal (HRP transmission). In the embodiment, the camcorder 20 starts a test HRP transmission to the television 10 and the BD system 30 via the antenna unit 201.

Before the HRP transmission, the camcorder 20 transmits a control signal indicating that a test HRP transmission is to be conducted. Here, information indicating that the control signal is transmitted by the camcorder 20 is included each transmission packet which includes the control signal.

Similarly, the BD system 30 also performs test HRP transmission via the antenna unit 301 in order to confirm with each of the apparatuses having the RX function whether or not HRP transmission is possible. It is to be noted that the BD system 30, which has both of the TX function and the RX function, does not perform HRP transmission to the RX function of the BD system 30. That is, the BD system 30 performs test HRP transmission only to the television 10 in the embodiment.

Each of the television 10 and the BD system 30, which have the RX function, confirms whether or not the apparatus has successfully received the HRP signals transmitted by the apparatuses having the TX function via its own antenna unit (106, 301).

When the receiving proves successful, each of the receiving apparatuses detects incident angles of the received signals using the orientation detection unit (102, 303) and notifies the control unit (104, 305) of the incident angles.

The control unit (104, 305) stores the information on each of the transmitting apparatuses of the received HRP signals in association with a corresponding one of the incident angles of the signals in the memory unit (105, 306). In addition, the control unit (104, 305) notifies, via a control signal, the transmitting apparatuses of whether or not the HRP signals have been successfully received.

Upon receiving, from all of the apparatuses having the RX function, control signals indicating whether or not the HRP signals have been successfully received, each of the camcorder 20 and the BD system 30 notifies the television 10, via a control signal, of whether or not HRP transmission from the other apparatuses is possible (S202 in FIG. 6).

For example, the camcorder 20 transmits, to the television 10, communication status information in an LRP signal. The communication status information indicates whether or not HRP transmission to the BD system 30 is possible.

The television 10 receives communication status information in the LRP signal transmitted from each of the camcorder 20 and the BD system 30 in S202. The communication status obtainment unit 104a thus receives the communication status information and stores the communication status information in the memory unit 105 (S102 in FIG. 5B).

Figure 7:
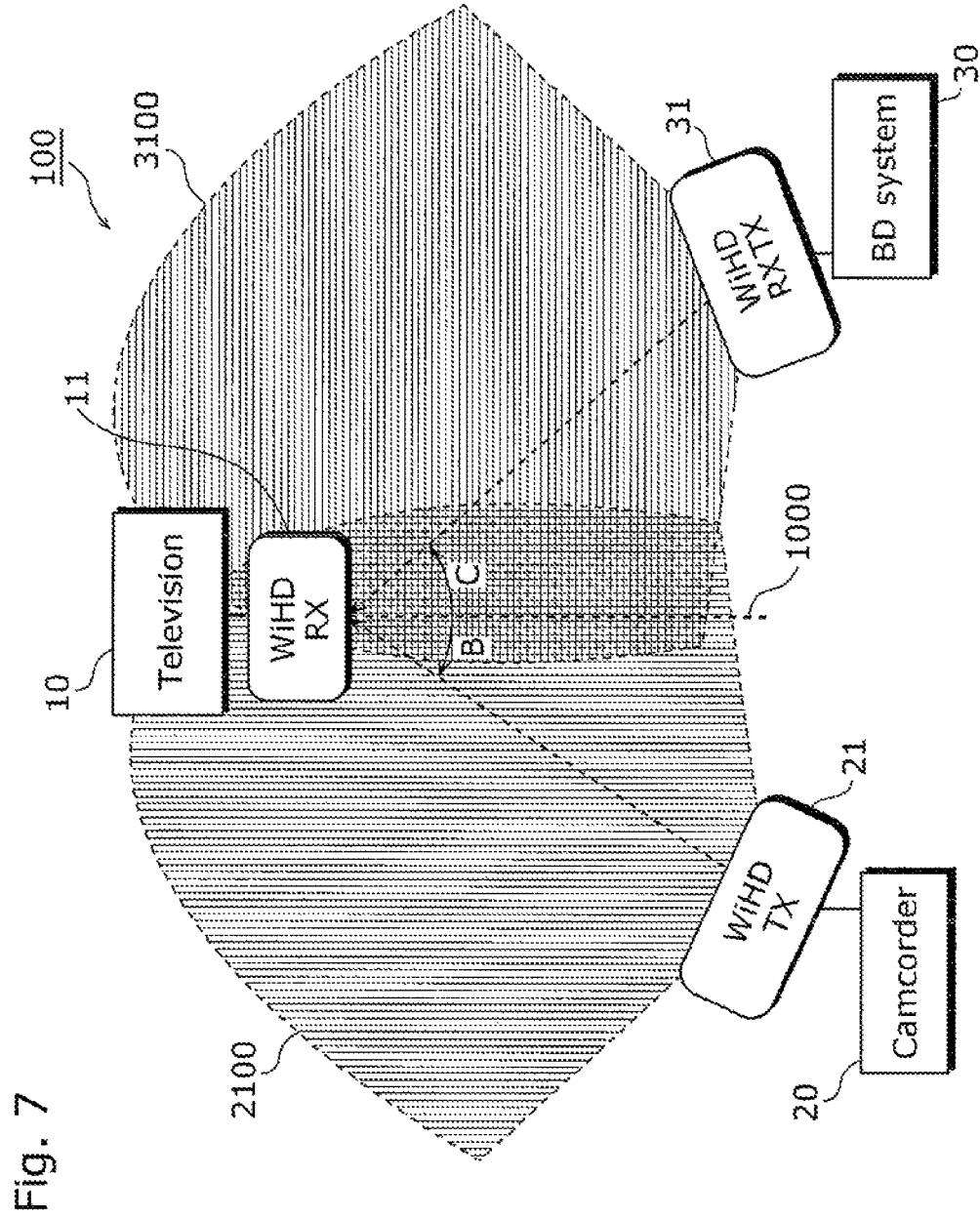
FIG. 7 shows an example of a communication range of a signal from a WiHD-TX and a communication range of a signal from a WiHD-RXTX according to the embodiment.

FIG. 7 shows an example of a communication range of a signal from the WiHD-TX 21 and a communication range of a signal from the WiHD-RXTX 31 according to the embodiment.

For example, the antennas (11, 21, and 31) are installed as shown in FIG. 7. In this case, the WiHD-RX 11 of the television 10 is located within both of a communication range 2100 of the HRP signal of the WiHD-TX 21 and a communication range 3100 of the HRP signal of the WiHD-RXTX 31.

Each of these antennas has a receiving range predetermined for HRP signals. Therefore, in order that the television 10 receives HRP signals from both of the camcorder 20 and the BD system 30, a condition needs to be satisfied that at least part of the WiHD-TX 21 and part of the WiHD-RXTX 31 be within the receiving range of the WiHD-RX 11. In the embodiment, this condition is satisfied as a premise.

HRP transmission from the camcorder 20 to the television 10 and HRP transmission from the BD system 30 to the television 10 are therefore possible.

However, the WiHD-RXTX 31 is not located within the communication range 2100 of the HRP signal from the WiHD-TX 21. HRP transmission from the camcorder 20 to the BD system 30 is therefore impossible.

In this case, these apparatuses detect communication statuses in the following manner.

The television 10 receives the HRP signal transmitted from each of the camcorder 20 and the BD system 30.

Here, the orientation detection unit 102 of the television 10 detects an incident angle of the signal transmitted from the camcorder 20 as an angle B, and an incident angle of the signal transmitted from the BD system 30 as an angle C.

The angles B and C are an example of information indicating the relative position between the first antenna and the second antenna with respect to the position of the antenna of the receiving apparatus. The relative position is detected by the wireless receiving apparatus according to the present invention.

The angle B and the angle C are angles with respect to a normal 1000 extending from the WiHD-RX 11 shown in FIG. 7. Here, angles of rotations right-handed to the normal 1000 have positive values. The angle B thus has a positive value and the angle C has a negative value.

The camcorder 20 detects that HRP transmission to the television 10 is possible and HRP transmission to the BD system 30 is impossible, and transmits to the television 10 communication status information indicating the result of the detection in an LRP signal.

The BD system 30 detects that HRP transmission to the television 10 is possible and receiving an HRP signal from the camcorder 20 is impossible, and transmits to the television 10 communication status information indicating the result of the detection in an LRP signal.

The control unit 104 of the television 10 then gives the image display unit 108 an instruction based on the received communication status information such that the image display unit 108 displays an OSD indicating whether or not there is a problem in WiHD communications with each of the apparatuses. Information indicating whether or not WiHD communications with each of the apparatuses is thereby displayed on the television 10 (S103 in FIG. 5B).

Whether or not WiHD communications between the camcorder 20 and the BD system 30 are possible is determined on the basis of communication status information transmitted from either of them.

FIG. 8 shows an example of information indicating whether or not WiHD communications are possible according to the embodiment.

In FIG. 8, it is shown that there is no problem in WiHD communications with the BD system 30 but there is a problem in WiHD communications with the camcorder 20.

In this case, for example, when not all of the apparatuses in the AV system 100 may perform WiHD communications (NO in S104 in FIG. 5B), details of the problem are displayed as shown in FIG. 9 in response to a predetermined operation on the television 10 by a user (S105 in FIG. 5B).

FIG. 9 shows an example of information indicating details of a problem in WiHD communications according to the embodiment.

As described above, the antennas (11, 21, and 31) in this example are disposed as shown in FIG. 7. The information shown in FIG. 9 therefore shows that there is no problem in HRP transmission from the camcorder 20 to the television 10 but HRP transmission from the camcorder 20 to the BD system 30 is impossible.

It is to be noted that processing of support for antenna installation is finished when WiHD communications are possible between all the apparatuses (YES in S104 in FIG. 5B).

The control unit 104 of the television 10 obtains, from the memory unit 105, the incident angle B of the HRP signal transmitted from the apparatus having the problem and the incident angle C of the HRP signal transmitted from the receiving apparatus (S106 in FIG. 5B).

In the present example, the control unit 104 of the television 10 obtains the incident angle B of the WiHD signal transmitted from the camcorder 20 and the incident angle C of the WiHD signal transmitted from the BD system 30.

The change information generation unit 104b of the control unit 104 calculates, from the incident angle B and the incident angle C, a change direction for the orientation of the antenna (WiHD-TX 21) of the camcorder 20 having a problem (S107 in FIG. 5B). Then, for example, when the incident angle B—the incident angle C>0, the change information generation unit 104b generates change information indicating a right-hand rotation. When incident angle B—incident angle C<0, the change information generation unit 104b generates change information indicating a left-hand rotation.

FIG. 10 is a drawing illustrating a relation between the incident angles of the two signals and the change direction for the antenna.

As shown in FIG. 10, the incident angle B>0 and the incident angle C<0 when the normal to the antenna (WiHD-RX 11) of the television 10 is used as a standard (0°) and right-hand rotation from the normal is indicated in positive degrees. Therefore, when the incident angle B—the incident angle C>0, the relative position between the camcorder 20 and the BD system 30, that is, the relative position between the WiHD-TX 21 and the WiHD-RXTX 31 with respect to the WiHD-RX 11 is that the WiHD-TX 21 is located to the right of the WiHD-RXTX 31 when viewed from the television 10.

In this case, in order to allow transmission of the HRP signal from the camcorder 20 to the BD system 30, the WiHD-TX 21 needs to be rotated right-handed when viewing the television 10 so that the WiHD-RXTX 31 is located within the communication range 2100 of the HRP signal of the WiHD-TX 21.

Then, the change information generation unit 104b generates and outputs change information for changing the orientation of the WiHD-TX 21 of the camcorder 20 (S108 in FIG. 5B). Specifically, the change information generation unit 104b generates and outputs change information indicating a direction for moving the communication range 2100 of the WiHD-TX 21 closer to the WiHD-RXTX 31.

In the embodiment, the change information generation unit 104b generates, as change information, an instruction for prompting a user to rotate the WiHD-TX 21 right-handed, and causes the image display unit 108 to display the change information.

FIG. 11 shows an exemplary display of information to show the user a change direction for the orientation of the antenna.

For example, by reading the display shown in FIG. 11, the user learns that the antenna (WiHD-TX 21) of the camcorder 20 should be turned right-handed.

While the user who has read the display is adjusting the orientation of the antenna, the television 10 repeats the processes from obtaining communication status information from each of the apparatuses (S102 in FIG. 5B) to outputting of change information (S108 in FIG. 5B) until communications with all of the apparatuses become possible.

For example, the television 10 repeats the processing every 0.5 seconds, and updates the OSD shown in FIG. 11.

Furthermore, in the embodiment, when transmission of an HRP signal from the camcorder 20 to the BD system 30 is made possible by the user's changing the orientation of the WiHD-TX 21, that is, when WiHD communications have become possible between all of the apparatuses, the control unit 104 of the television 10 causes the image display unit 108 to display an OSD to notify the user of this.

Figure 12:
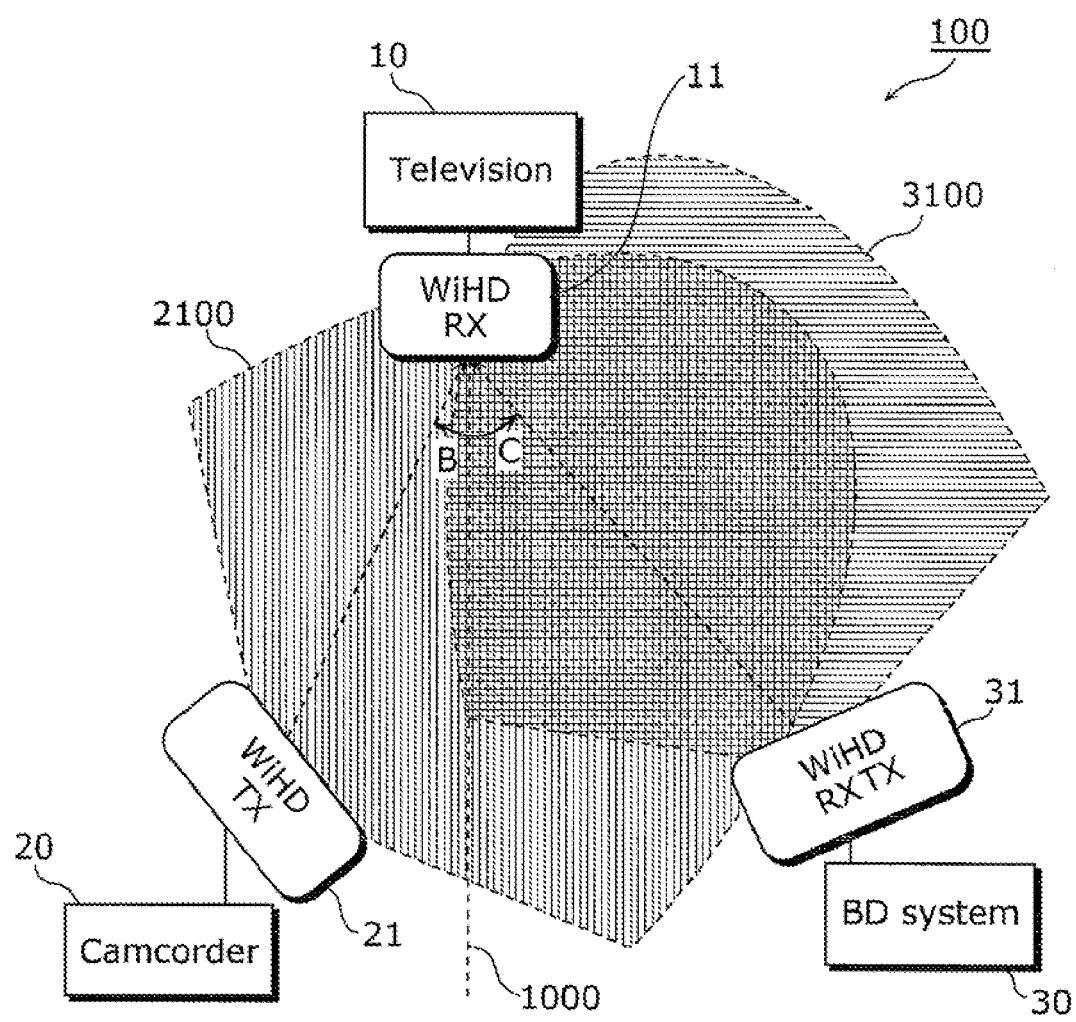
FIG. 12 shows another example of a communication range of a signal from the WiHD-TX and a communication range of a signal from the WiHD-RXTX according to the embodiment.

FIG. 12 shows another example of a communication range of the WiHD-TX 21 and a communication range of the WiHD-RXTX 31 according to the embodiment.

In this manner, orientation of the WiHD-TX 21 is rotated right-handed by the user. Part of the WiHD-RXTX 31 is thereby located within the communication range 2100 of the HRP signal from the WiHD-TX 21. As a result, transmission of the HRP signal from the camcorder 20 to the BD system 30 is possible.

It is to be noted that in the status shown in FIG. 12 the WiHD-TX 21 is located within a range in which the WiHD-TX 21 may receive the HRP signal from the WiHD-RXTX 31.

When transmission of an HRP signal from the camcorder 20 to the BD system 30 becomes possible, the communication status obtainment unit 104a of the television 10 receives communication status information indicating that the transmission is possible from at least one of the camcorder 20 and the BD system 30.

The communication status obtainment unit 104a then notifies the change information generation unit 104b that WiHD communication is possible between all of the apparatuses.

When receiving the notification, the change information generation unit 104b causes the image display unit 108 to display an OSD as shown in FIG. 13.

FIG. 13 shows an exemplary display of information to notify the user that WiHD communications are now possible between all of the apparatuses.

The display showing such information on the image display unit 108 disappears after a predetermined period of time or in response to a predetermined operation on the television 10 by a user. Then, for example, the user may cause the television 10 to display AV content recorded on the camcorder 20 and simultaneously cause the BD system 30 to output sound of the AV content from the speakers thereof.

In this manner, when WiHD signals are transmitted between the apparatuses which communicate with the television 10, the television 10 according to the embodiment allows a user to easily install the antennas for use in the transmission in appropriate orientations.

In the embodiment, the orientation detection unit 102 detects incident angles of the signals transmitted from the two apparatuses with respect to the WiHD-RX 11, and the change information generation unit 104b determines a relative position between the two antennas (the WiHD-TX 21 and WiHD-RXTX 31) with respect to the WiHD-RX 11 from the magnitudes of the incident angles, and generates change information indicating the result of the determination.

The incident angles are determined angles with respect to the normal to the WiHD-RX 11. However, the incident angles need not be determined with respect to the normal. In other words, incident angles may be determined with respect to a line extending from the WiHD-RX 11 in any direction, as long as the magnitude relation between the incident angles may be determined.

Alternatively, the relative position between two antennas may be determined from other than incident angles of the signals from the antennas. For example, when antenna elements of the antenna unit 106 have received a signal transmitted from the camcorder 20, whether the received signal is transmitted from the right or left of the WiHD-RX 11 is determined from a phase difference in the received signal between the antenna elements. That is, whether the WiHD-TX 21 is located to the right or left of the WiHD-RX 11 is determined.

Next, whether the WiHD-RXTX 31 of the BD system 30 is located to the right or left of the WiHD-RX 11 is determined.

A relative position between the two antennas is determined when the result of the determination shows that one of the two antennas is to the right and the other is two the left.

When both of the two antennas are determined to be located to one of the right and left of the WiHD-RX 11, a relative position between the two antennas may be determined from the magnitude relation between incident angles determined as shown in the above example.

Alternatively, for example, a relative position between the two antennas may be determined from incident angles of infrared light or sound waves transmitted from the two antennas with respect to the WiHD-RX 11 or information indicating absolute positions of the two antennas and obtained from the global positioning system (GPS).

Alternatively, for example, a relative position between the two antennas may be determined by processing images captured from the position of the WiHD-RX 11.

Alternatively, a relative position between the two antennas may be calculated by not by the change information generation unit 104b but by the orientation detection unit 102. In this case, the change information generation unit 104b obtains the calculation result and generates change information including the calculation result.

Alternatively, the apparatus other than the television 10 may calculate a change direction. For example, the camcorder 20 or the BD system 30 receives from the television 10 information indicating the incident angle B and the incident angle C (see FIG. 7) in an LRP signal and calculates a change direction using the information. In this case, the change information generation unit 104b generates change information indicating the change direction and received from the camcorder 20 or the BD system 30.

In other words, the change information generation unit 104b generates, based on the detected information, change information indicating a relative position between the WiHD-TX 21 and the WiHD-RXTX 31 with respect to the position of the WiHD-RX 11, and intermediate processes such as a calculation of the result of the determination may be performed by the other apparatuses.

In the embodiment, the change information generation unit 104b generates change information for changing the orientation of the antenna (WiHD-TX 21) of the camcorder 20 when transmission of an HRP signal from the camcorder 20 to the BD system 30 is impossible.

However, there may be a case where at least part of the WiHD-RXTX 31 is placed in the communication range 2100 of the WiHD-TX 21 by changing the orientation of the WiHD-RXTX 31. In that case, the change information generation unit 104b may generate change information for changing the orientation of the antenna WiHD-RXTX 31 of the BD system 30.

The change information generation unit 104b may also generate change information for changing the orientation of both of the antennas. In other words, when a signal is transmitted from one of two apparatuses to the other, installation of antennas for use in the transmission may be facilitated by generating and outputting change information for changing at least one of antennas of two apparatuses from one of which a signal is transmitted to the other.

In the embodiment, the change direction indicated in the change information is presented to the user as an image as shown in FIG. 11.

However, a rotation direction may be presented to a user otherwise. For example, a change direction may be presented to a user using sound, blinking light, or vibration of an object. Optionally, they may be used in combination to present a change direction to a user.

In the embodiment, WiHD is used as a method of wireless transmission between the television 10, the camcorder 20, and the BD system 30. However, another method of wireless transmission may be used instead.

For example, a method of wireless transmission using a radiowave in a millimetric wave zone, such as a wireless transmission method in which a 2.4-GHz or 5-GHz radiowave is used in accordance with the IEEE 802.11 may be used.

In other words, it is difficult for a user to install an antenna using a conventional technique in the case where a radiowave such as a millimetric wave, which is highly directive, is used for wireless transmission. In contrast, the television 10 according to the embodiment appropriately supports antenna installation by a user.

VARIATION OF EMBODIMENT

In the embodiment, the change information generation unit 104b generates change information including the content as shown in FIG. 11, and causes the image display unit 108 to display the change information, and thereby supporting changing of the orientation of an antenna by a user.

However, in the case where, for example, the antenna to be oriented may be rotated by a rotation drive unit including a motor, the change information generation unit 104b may transmit change information to the rotation drive unit.

In other words, the antenna may be oriented not by a user but by itself.

Figure 14:
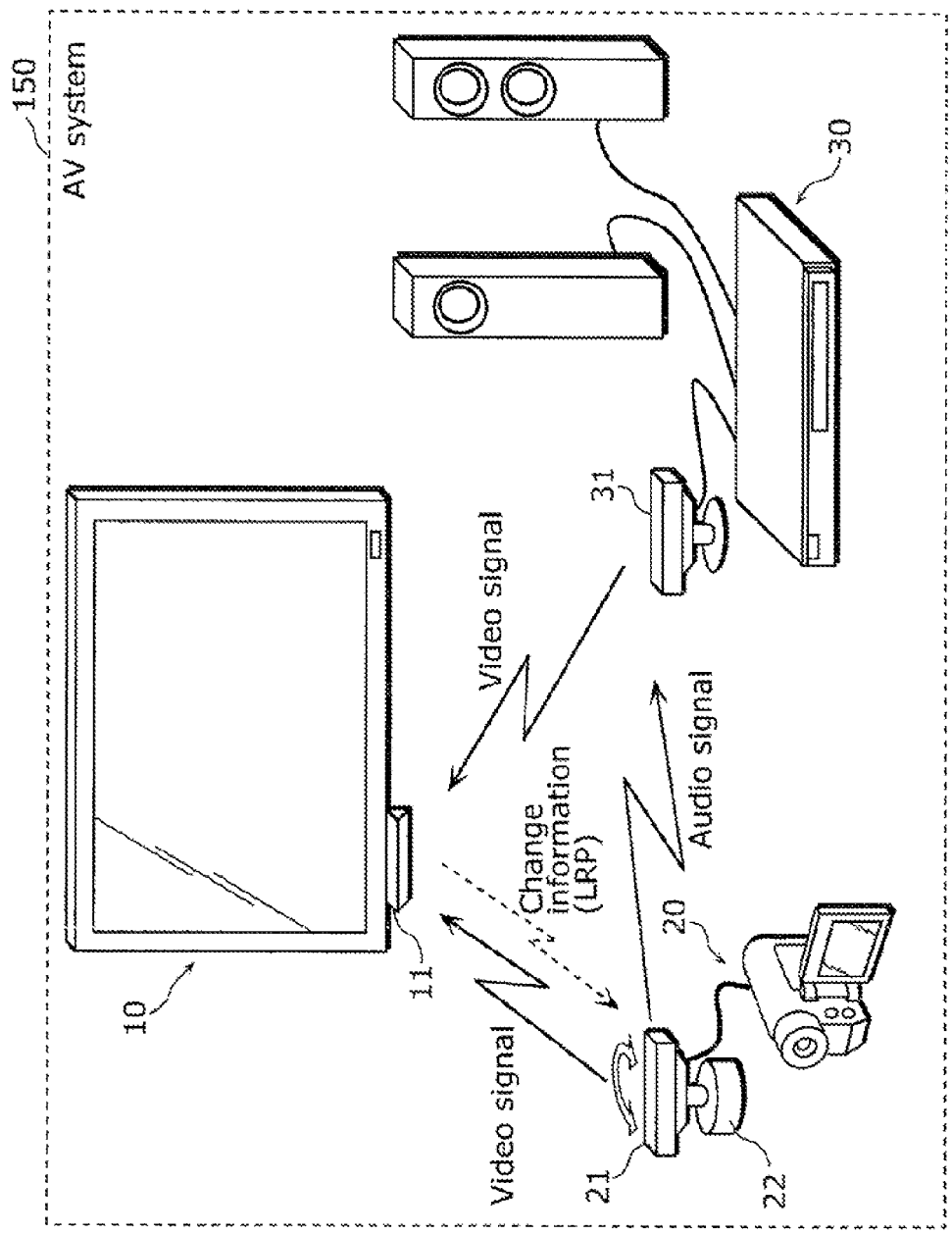
FIG. 14 shows a configuration of an AV system according to a variation of the embodiment.

FIG. 14 shows a configuration of an AV system 150 according to a variation of the embodiment.

Figure 15:
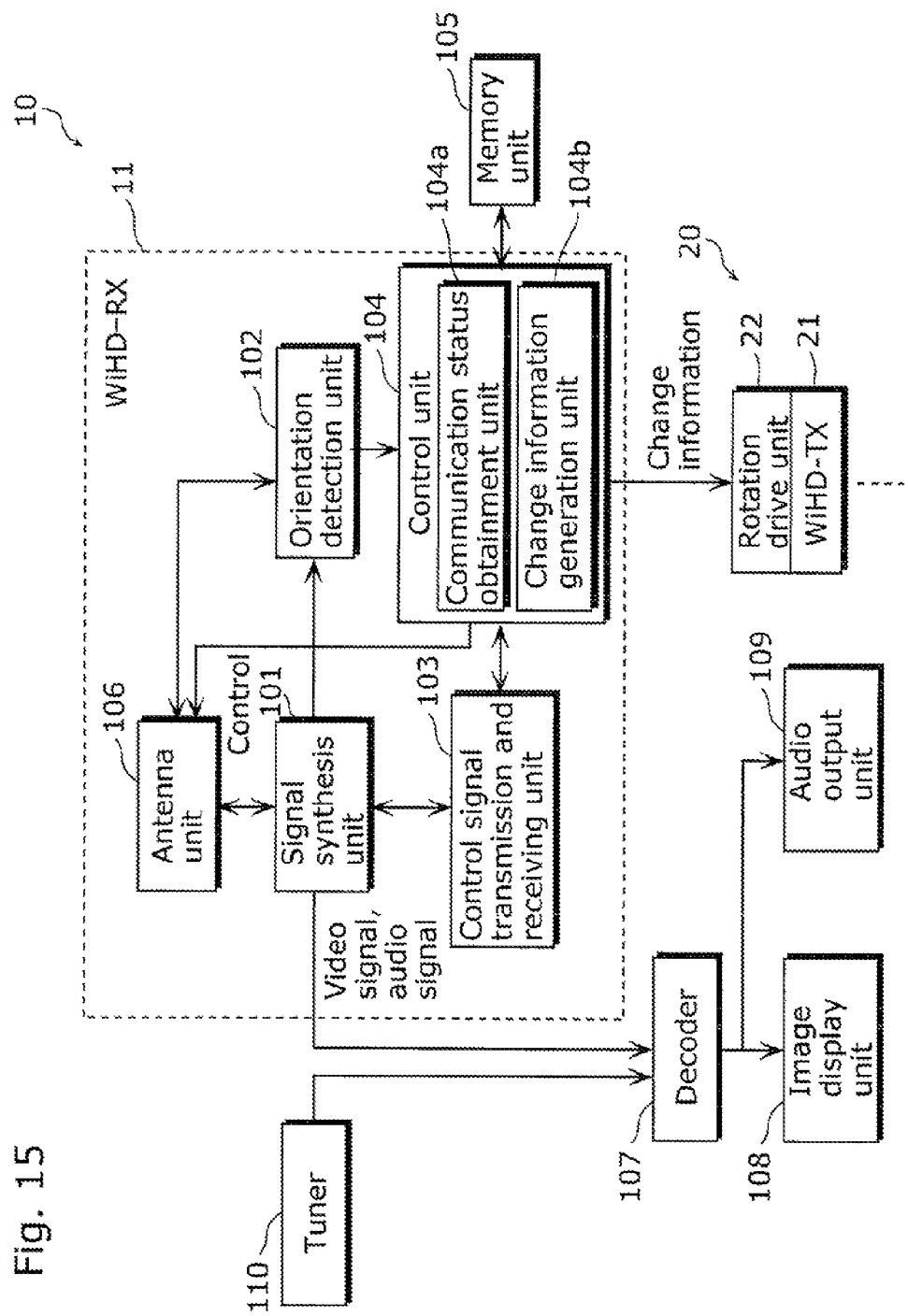
FIG. 15 is a block diagram showing a configuration of main functions of the television according to the variation of the embodiment.

FIG. 15 is a block diagram showing a configuration of main functions of the television 10 according to the variation of the embodiment.

The AV system 150 is another example of the wireless communication system according to the present invention. In the AV system 150, the WiHD-TX 21 of the camcorder 20 is rotatably supported by a rotation drive unit 22 as shown in FIG. 14. The rotation drive unit 22 includes, for example, a stepper motor such that the rotation drive unit 22 may rotate the WiHD-TX 21 by a specified angle.

In addition, as shown in FIG. 15, the control unit 104 according to the variation of the embodiment transmits change information generated by the change information generation unit 104b to the rotation drive unit 22.

The change information includes information indicating a rotation direction and a rotation angle calculated for the WiHD-TX 21 using the incident angle B and the incident angle C shown in FIG. 7, for example. The change information is transmitted to the WiHD-TX 21 in an LRP signal, and the rotation drive unit 22 receives the change information via the WiHD-TX 21.

The rotation angle is, for example, a value estimated from the incident angle B and the incident angle C. Upon receiving the change information, the rotation drive unit 22 rotates the WiHD-TX 21 by the rotation angle.

Then, the television 10 receives communication status information indicating whether or not it is possible to transmit an HRP signal from the camcorder 20 to the BD system 30, and terminates the processing of changing the orientation of the WiHD-TX 21 when the transmission is possible.

When the communication status information indicates that the transmission is not possible, the change information generation unit 104b repeatedly generates change information including an instruction of rotation by a predetermined angle (for example, 5°) and transmits the change information to the rotation drive unit 22 until the transmission becomes possible.

Alternatively, the first change information may include such a predetermined angle (for example, 5°) instead of the rotation angle estimated from the incident angle B and the incident angle C. Even in this case, the transmission is made possible by repeatedly checking whether or not it is possible to transmit an HRP signal from the camcorder 20 to the BD system 30 and resending change information for the case where the transmission is not possible.

Alternatively, the change information generation unit 104b may output change information for rotating the WiHD-TX 21 to the rotation drive unit 22, and output, to the image display unit 108, change information in order to notify a user that the WiHD-TX 21 is rotated for adjustment of the orientation of the WiHD-TX 21.

This explicitly inform the user that the WiHD-TX 21 is rotating under automatic control.

Alternatively, the television 10 may generate and output change information in order to cause the WiHD-RXTX 31 to automatically rotate instead of or in addition to the WiHD-TX 21.

INDUSTRIAL APPLICABILITY

The present invention is applicable as an apparatus or a method for installation of antennas of AV apparatuses having a communication function ands included in a wireless communication system when a user installs the apparatuses. Therefore, the present invention is applicable as a wireless communication system including AV apparatuses, wireless receiving apparatuses included in a wireless communication system, and the like.

REFERENCE SIGNS LIST

10 Television
11 WiHD-RX
20 Camcorder
21 WiHD-TX
22 Rotation drive unit
30 BD system
31 WiHD-RXTX
100, 150 AV system
101, 202, 302 Signal synthesis unit
102, 303 Orientation detection unit
103, 204, 304 Control signal transmission and receiving unit
104, 205, 305 Control unit
104a Communication status obtainment unit
104b Change information generation unit
105, 206, 306 Memory unit
106, 201, 301 Antenna unit
107, 207, 308 Decoder
108 Image display unit
109, 309 Audio output unit
110 Tuner
208 Video and audio storage unit
209 Encoder
210, 310 Video and audio input unit

The invention claimed is:

1. A wireless receiving apparatus comprising:
a receiving-apparatus antenna for receiving signals transmitted from a first apparatus and a second apparatus via an antenna of each of the first apparatus and the second apparatus;
a detection unit configured to detect information indicating a relative position between a first antenna of the first apparatus and a second antenna of the second apparatus with respect to a position of said receiving-apparatus antenna;
a communication status obtainment unit configured to obtain, from the first apparatus or the second apparatus, communication status information indicating whether or not it is possible to transmit a video signal or an audio signal from one of the first apparatus and the second apparatus to the other; and
a change information generation unit configured to generate, when the communication status information obtained by said communication status obtainment unit indicates that the transmission is not possible, change information based on the information detected by said detection unit and output the change information, the change information indicating a change direction for an orientation of the first antenna such that a communication range is closer to the second antenna, and the communication range being a range covered by the transmission of the video signal or the audio signal from the first antenna.

2. The wireless receiving apparatus according to claim 1, further comprising
an image display unit configured to display an image showing the change direction indicated in the change information output from said change information generation unit.

3. The wireless receiving apparatus according to claim 2, wherein said image display unit is configured to display, in addition to the image showing the change direction, a video represented by the video signal transmitted from said first apparatus or said second apparatus and received via said receiving-apparatus antenna.

4. The wireless receiving apparatus according to claim 1, wherein the first antenna is rotatably supported by a rotation drive unit configured to operate according to the change information, and
said change information generation unit is configured to generate the change information indicating a change direction for the orientation of the first antenna and output the generated change information to the rotation drive unit to rotate the first antenna in the change direction.

5. The wireless receiving apparatus according to claim 1, wherein said detection unit is configured to detect, as information indicating the relative position, (i) a first incident angle of a signal transmitted from said first apparatus with respect to said receiving-apparatus antenna and (ii) a second incident angle of a signal transmitted from said second apparatus with respect to said receiving-apparatus antenna, and
said change information generation unit is configured to determine a relative position between the first antenna and the second antenna from a magnitude relation between the first incident angle and the second incident angle, and generate the change information indicating the change direction for the orientation of the first antenna according to the relative position.

6. The wireless receiving apparatus according to claim 1, wherein said detection unit is configured to detect, as information indicating the relative position, (i) a first incident angle of a signal transmitted from said first apparatus with respect to said receiving-apparatus antenna and (ii) a second incident angle of a signal transmitted from said second apparatus with respect to said receiving-apparatus antenna,
said receiving-apparatus antenna transmits, to said first apparatus or said second apparatus, information indicating the first incident angle and the second incident angle, and
said change information generation unit is configured to generate the change information indicating a change direction for the orientation of the first antenna according to a relative position between the first antenna and the second antenna, the relative position being determined, from a magnitude relation between the first incident angle and the second incident angle, by one of said first apparatus and said second apparatus which has received the information.

7. The wireless receiving apparatus according to claim 1, wherein said communication status obtainment unit is configured to obtain communication status information indicating whether or not it is possible to transmit a video signal or an audio signal from one of said first apparatus and said second apparatus to the other using a high rate physical layer (HRP) specified by a WirelessHD standard.

8. The wireless receiving apparatus according to claim 1, wherein said communication status obtainment unit is further configured to repeatedly obtain communication status information indicating whether or not the transmission is possible, until said communication status obtainment unit obtains communication status information indicating that the transmission is possible, and said change information generation unit is further configured to repeatedly output change information indicating a direction for moving the communication range of the first antenna closer to the second antenna, until said communication status obtainment unit obtains the communication status information indicating that the transmission is possible.

9. A wireless communication system comprising a first apparatus, a second apparatus, and a wireless receiving apparatus,
   wherein the first apparatus includes a first antenna for transmission of a signal between the first apparatus and the second apparatus and between the first apparatus and the wireless receiving apparatus,
   the second apparatus includes a second antenna for transmission of a signal between the second apparatus and the first apparatus and between the second apparatus and the wireless receiving apparatus,
   said wireless receiving apparatus includes:
   a receiving-apparatus antenna for receiving signals transmitted from the first apparatus and the second apparatus via the first antenna and the second antenna respectively included in the first apparatus and the second apparatus;
   a detection unit configured to detect information indicating a relative position between the first antenna and the second antenna with respect to a position of the receiving-apparatus antenna;
   a communication status obtainment unit configured to obtain, from the first apparatus or the second apparatus, communication status information indicating whether or not it is possible to transmit a video signal or an audio signal from one of the first apparatus and the second apparatus to the other; and
   a change information generation unit configured to generate, when the communication status information obtained by said communication status obtainment unit indicates that the transmission is not possible, change information based on the information detected by said detection unit and output the change information, the change information indicating a change direction for an orientation of the first antenna such that a communication range is closer to the second antenna, and the communication range being a range covered by the transmission of the video signal or the audio signal from the first antenna.

10. A method of supporting antenna installation, said method being performed by a wireless receiving apparatus,
   the wireless receiving apparatus including a receiving-apparatus antenna for receiving signals transmitted from a first apparatus and a second apparatus via an antenna of each of the first apparatus and the second apparatus,
   said method comprising:
   detecting information indicating a relative position between a first antenna of the first apparatus and a second antenna of the second apparatus with respect to a position of the receiving-apparatus antenna;
   obtaining, from the first apparatus or the second apparatus, communication status information indicating whether or not it is possible to transmit a video signal or an audio signal from one of the first apparatus and the second apparatus to the other; and
   generating, when the communication status information obtained in said obtaining indicates that the transmission is not possible, change information based on the information detected by said detecting, and outputting the change information, the change information indicating a change direction for an orientation of the first antenna such that a communication range is closer to the second antenna, and the communication range being a range covered by the transmission of the video signal or the audio signal from the first antenna.

* * * * *